US009912204B2

(12) United States Patent
Totoki et al.

(10) Patent No.: US 9,912,204 B2
(45) Date of Patent: Mar. 6, 2018

(54) PERMANENT MAGNET TYPE ROTATING ELECTRIC MACHINE

(71) Applicant: Mitsubishi Electric Corporation, Tokyo (JP)

(72) Inventors: Eigo Totoki, Tokyo (JP); Toshinori Tanaka, Tokyo (JP); Tomoya Tachibana, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 204 days.

(21) Appl. No.: 14/434,865

(22) PCT Filed: Dec. 9, 2013

(86) PCT No.: PCT/JP2013/082948
§ 371 (c)(1),
(2) Date: Apr. 10, 2015

(87) PCT Pub. No.: WO2014/115435
PCT Pub. Date: Jul. 31, 2014

(65) Prior Publication Data
US 2015/0270750 A1     Sep. 24, 2015

(30) Foreign Application Priority Data
Jan. 28, 2013 (JP) .................................. 2013-012902

(51) Int. Cl.
*H02K 1/27* (2006.01)
(52) U.S. Cl.
CPC .............. *H02K 1/278* (2013.01); *H02K 1/276* (2013.01); *H02K 2201/06* (2013.01)

(58) Field of Classification Search
CPC ............ H02K 1/27; H02K 1/06; H02K 1/278; H02K 2201/06
(Continued)

(56) References Cited

U.S. PATENT DOCUMENTS

2002/0047431 A1    4/2002  Fukushima
2002/0171309 A1*  11/2002  Wakui .................. H02K 1/2766
                                                         310/156.48
(Continued)

FOREIGN PATENT DOCUMENTS

JP    4-261352 A    9/1992
JP    6-245417 A    9/1994
(Continued)

*Primary Examiner* — Terrance Kenerly
(74) *Attorney, Agent, or Firm* — Oblon, McClelland, Maier & Neustadt, L.L.P.

(57) ABSTRACT

In conventional rotors having a shape in which permanent magnets are skewed, a configuration in which, for example, the thicknesses of both ends of each magnet are increased is used in order to make the rotors symmetric between the forward and reverse directions, thereby causing excessive increase in the thicknesses.

In a rotor 2 in which permanent magnets form magnet poles and the permanent magnets are skewed with respect to the axial direction, the thickness of each permanent magnet is increased at a portion that is most likely to be demagnetized, that is, a positive side portion F in a rotor part 2A skewed in the positive direction and a negative side portion F in a rotor part 2B skewed in the negative direction, whereby a demagnetization resistance strengthened portion is formed.

7 Claims, 13 Drawing Sheets

(58) Field of Classification Search
USPC .......................... 310/156.25, 156.46, 156.47
See application file for complete search history.

(56) References Cited

U.S. PATENT DOCUMENTS

| | | | | |
|---|---|---|---|---|
| 2004/0207280 A1* | 10/2004 | Luo | ............... | H02K 1/278 |
| | | | | 310/156.47 |
| 2005/0110356 A1* | 5/2005 | Imamura | ............... | H02K 1/278 |
| | | | | 310/156.53 |
| 2009/0267437 A1* | 10/2009 | Chai | ............... | H02K 1/278 |
| | | | | 310/156.25 |
| 2010/0109468 A1* | 5/2010 | Natsumeda | ............... | H02K 1/02 |
| | | | | 310/156.43 |
| 2010/0176680 A1 | 7/2010 | Murakami et al. | | |
| 2010/0301697 A1 | 12/2010 | Takahashi et al. | | |
| 2011/0309706 A1 | 12/2011 | Takahashi et al. | | |

FOREIGN PATENT DOCUMENTS

| | | | |
|---|---|---|---|
| JP | 8-251847 | A | 9/1996 |
| JP | 2001-314050 | A | 11/2001 |
| JP | 2010-166683 | A | 7/2010 |
| JP | 2011-135638 | A | 7/2011 |
| WO | WO 2009/069575 | A1 | 6/2009 |
| WO | WO 2010/070900 | A1 | 6/2010 |

\* cited by examiner

PERMANENT MAGNET TYPE ROTATING ELECTRIC MACHINE

TECHNICAL FIELD

The present invention relates to a permanent magnet type rotating electric machine.

BACKGROUND ART

In some permanent magnet type rotating electric machines, for the purpose of reducing torque pulsation such as cogging torque or torque ripple, a shape in which positions of magnetic poles are changed with respect to the axial direction, i.e., a so-called skewed shape is used for an armature or a field magneton. For example, in some permanent magnet rotating electric machines having permanent magnets in a rotor, the magnets are divided in the axial direction and arranged with their angles shifted in the circumferential direction so that torque pulsations such as cogging torques or torque ripples occurring in respective parts are cancelled, whereby torque pulsation in the entire motor is reduced. Such a permanent magnet rotating electric machine is disclosed in, for example, Japanese Laid-Open Patent Publication No. 6-245417 (Patent Document 1), Japanese Laid-Open Patent Publication No. 8-251847 (Patent Document 2), and Japanese Laid-Open Patent Publication No. 2001-314050 (Patent Document 3).

CITATION LIST

Patent Document

Patent Document 1: Japanese Laid-Open Patent Publication No. 6-245417 (FIG. 2)
Patent Document 2: Japanese Laid-Open Patent Publication No. 8-251847 (FIG. 3)
Patent Document 3: Japanese Laid-Open Patent Publication No. 2001-314050 (FIG. 5)

SUMMARY OF THE INVENTION

Problems to be Solved by the Invention

Permanent magnet type rotating electric machines require a structure that prevents demagnetization of a permanent magnet. Normally, in order to prevent demagnetization, a configuration in which the thickness of an end portion of a permanent magnet is increased or coercivity of a permanent magnet is increased, is used. In a rotor having a shape in which permanent magnets are skewed in conventional technique, in order to make the rotor symmetric between forward and reverse rotations, the above configuration is used for both ends of each magnet, that is, the thicknesses of both ends are increased or coercivities of both ends are increased. However, in some cases, a magnet whose thickness is excessively increased or whose coercivity is excessively great is used.

The present invention has been made to solve the above problem, and an object of the present invention is to, by figuring out a portion that is most likely to be demagnetized in a rotor in which permanent magnets form magnetic poles and the permanent magnets are skewed, and employing a structure in which demagnetization resistance is locally increased at the portion, that is, employing a structure in which the magnet thickness at the portion is increased or magnet coercivity at the portion is increased, obtain a permanent magnet type rotating electric machine with the rotor having skew, in which the entire rotor is symmetric between forward and reverse rotations though each part of the rotor or each single magnetic pole is asymmetric between forward and reverse rotations, and demagnetization resistance is great while a magnet with a small weight or a magnet made of a low-coercivity material is used in the rotor.

Solution to the Problems

A permanent magnet type rotating electric machine according to the present invention includes a rotor in which a plurality of magnet poles are formed by permanent magnets. In the case where a predetermined rotational direction of the rotor is defined as a positive direction of a mechanical angle indicating a magnetic pole position, in a first rotor part composing a part in an axial direction of the rotor, each magnetic pole position is displaced in the positive direction with respect to each magnetic pole center in average of an entirety in the axial direction of the rotor, and in a second rotor part composing a part in the axial direction of the rotor at a different position in the axial direction from that of the first rotor part, each magnetic pole position is displaced in a negative direction with respect to each magnetic pole center in average of the entirety in the axial direction of the rotor, whereby entire magnetic poles in the rotor are formed. In each permanent magnet forming the magnetic pole in the first rotor part in which each magnetic pole is displaced in the positive direction of the rotor, a positive side end in a circumferential direction of the permanent magnet is formed to be a demagnetization resistance strengthened portion having stronger demagnetization resistance than a negative side end. In each permanent magnet forming the magnetic pole in the second rotor part in which each magnetic pole is displaced in the negative direction of the rotor, a negative side end in a circumferential direction of the permanent magnet is formed to be a demagnetization resistance strengthened portion having stronger demagnetization resistance than a positive side end.

Effect of the Invention

The present invention makes it possible to obtain a permanent magnet type rotating electric machine with a rotor having skew, in which the entire rotor is symmetric between forward and reverse rotations though each part of the rotor or each single magnetic pole is asymmetric between forward and reverse rotations, and demagnetization resistance is great as a whole while a magnet with a small weight or a magnet made of a low-coercivity material is used in the rotor.

DESCRIPTION OF EMBODIMENTS

Embodiment 1

Embodiment 1 according to the present invention will be described with reference to FIGS. 1 to 6. FIGS. 1 to 5 are schematic development diagrams for explaining basic matters relevant to the present invention, and a perspective view of a rotor of a rotating electric machine. FIG. 6 is a perspective view of a rotor of a rotating electric machine according to embodiment 1 and schematic views showing cross sectional shapes at respective parts of the rotor.

Hereinafter, it will be described that, in the case where a rotor of a permanent magnet type rotating electric machine has permanent magnets to form magnetic poles and the permanent magnets are skewed, there is a specific portion that is likely to be demagnetized in each permanent magnet in the rotor. In order to clarify a portion that is likely to be demagnetized in a rotor having skew, first, a portion that is likely to be demagnetized in a rotor having no skew will be described.

Figure 1:
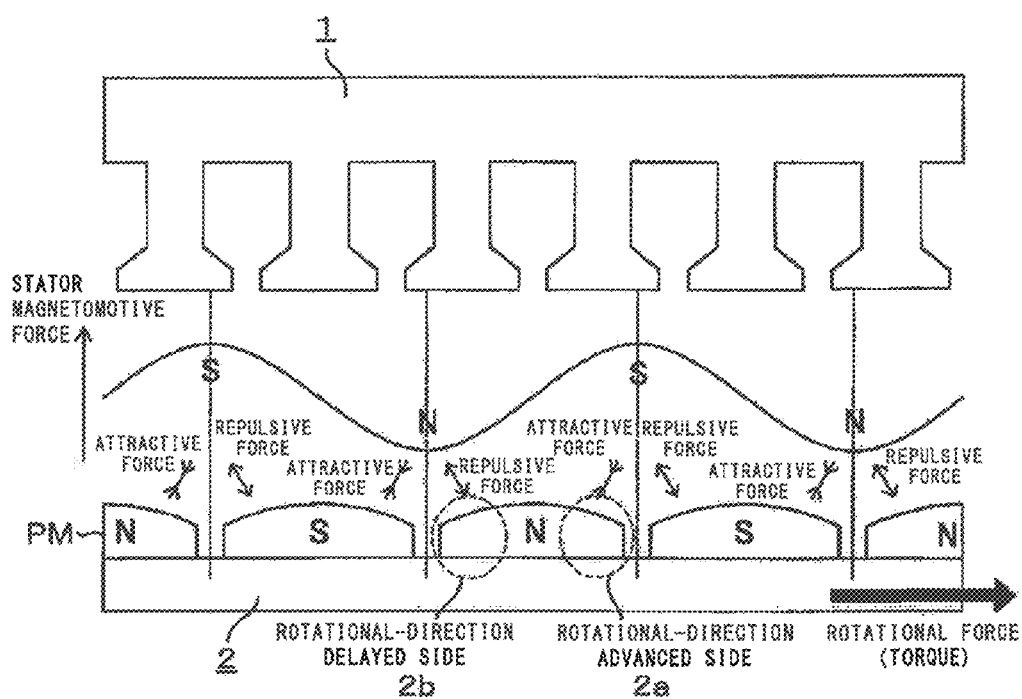
FIG. 1 is a schematic development diagram for explaining a stator magnetomotive force and a relative position of a rotor in a permanent magnet type rotating electric machine that is rotating by q-axis current application.
Figure 2:
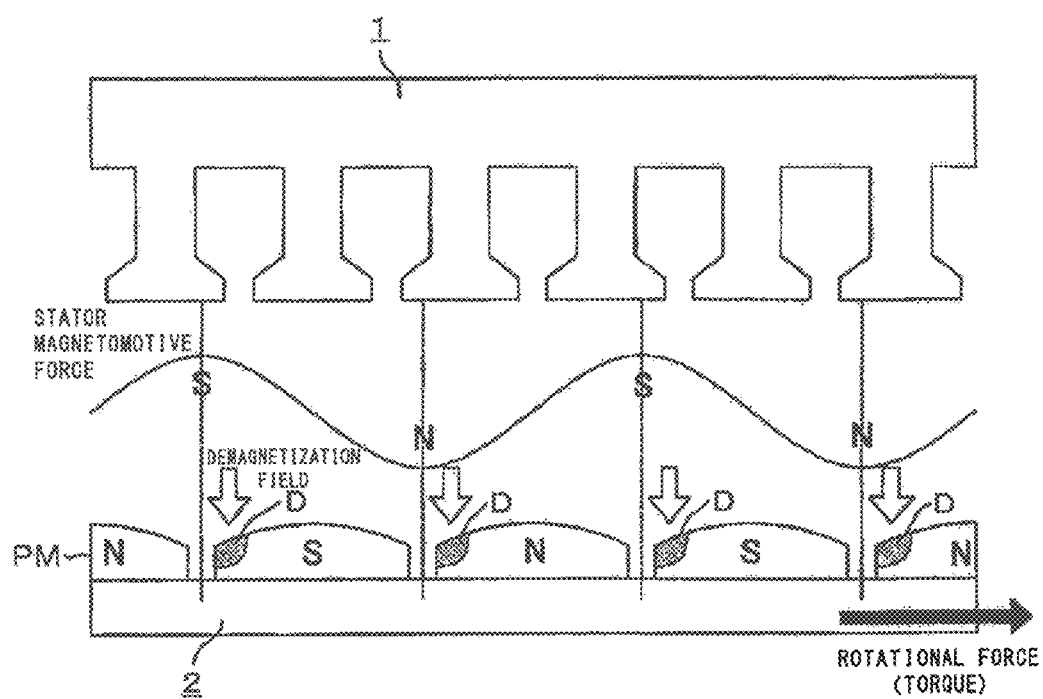
FIG. 2 is a schematic development diagram for explaining a portion that is likely to be demagnetized in a permanent magnet type rotating electric machine that is rotating by q-axis current application.

FIG. 1 and FIG. 2 are schematic development diagrams for explaining a magnetomotive force of a stator 1 and a relative position of a rotor 2 in a permanent magnet type rotating electric machine that is rotating. FIG. 1 and FIG. 2 show the case where a current application phase of the stator 1 is such that a peak of a fundamental wave of a stator magnetomotive force waveform appears between magnetic poles in the rotor 2, that is, the case of q-axis current application.

Here, as terms indicating a position in the rotational direction of a permanent magnet, a side toward the rotational direction of the rotor 2 is referred to as a rotational-direction advanced side, and a side opposite to the rotational direction of the rotor 2 is referred to as a rotational-direction delayed side. That is, in FIG. 1, a position 2a of each magnet is the rotational-direction advanced side, and a position 2b of each magnet is the rotational-direction delayed side.

As shown in FIG. 1, at the rotational-direction advanced side 2a, a permanent magnet PM of the rotor 2 is subjected to an attractive force by a stator magnetomotive force, and at the rotational-direction delayed side 2b, is subjected to a repulsive force by a stator magnetomotive force, whereby the rotor 2 obtains a force for rotating in the rotational direction, that is, torque. In other words, at the rotational-direction advanced side 2a, a permanent magnet of the rotor 2 is subjected to a magnetic field from the stator in a direction to strengthen the magnetic flux of the magnet, and at the rotational-direction delayed side 2b, is subjected to a magnetic field from the stator 1 in a direction to weaken the magnetic flux of the magnet.

FIG. 2 shows this situation. Since, at the rotational-direction delayed side 2b of the rotor 2, a permanent magnet of the rotor 2 is subjected to a magnetic field from the stator 1 in a direction to weaken the magnetic flux of the magnet, the rotational-direction delayed side 2b is most likely to be demagnetized. In FIG. 2, a portion that is likely to be demagnetized is indicated by a character D.

The above is a consideration in the case of q-axis current application, but the fact that a permanent magnet of the rotor 2 is likely to be demagnetized at the rotational-direction delayed side 2b of the rotor 2 holds true also for the case of field weakening.

Figure 3:
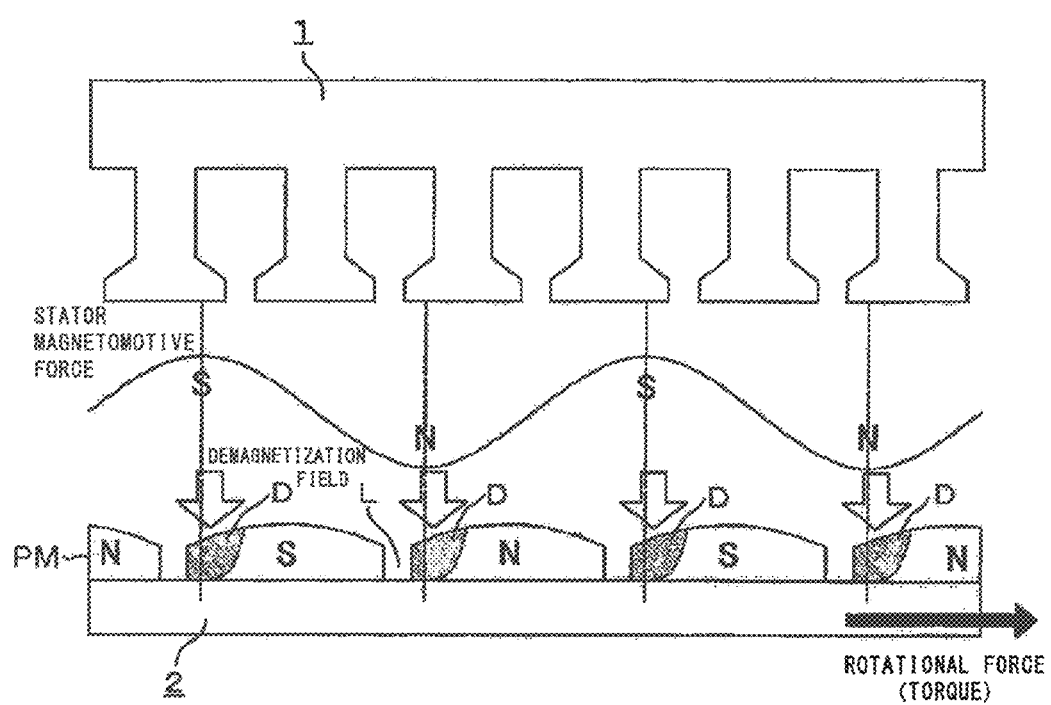
FIG. 3 is a schematic development diagram for explaining a stator magnetomotive force and a relative position of a rotor in a permanent magnet type rotating electric machine that is rotating by field weakening current application.

FIG. 3 is a schematic diagram for explaining a stator magnetomotive force and a relative position of the rotor 2 in the permanent magnet type rotating electric machine that is rotating by field weakening current application. In the field weakening current application which is current application that weakens the magnetic flux of a permanent magnet, the permanent magnet is more likely to be demagnetized. In the field weakening current application, a rotor position delays relative to the stator magnetomotive force. Therefore, as shown in FIG. 3, a peak of the stator magnetomotive force shifts from a portion L between the magnet poles to a delayed side portion of a magnet located at the advanced side with respect to the portion L between the magnet poles. As a result, the rotational-direction delayed side of a magnet is more likely to be demagnetized than in the q-axis current application. In FIG. 3, a portion that is likely to be demagnetized is indicated by a character D.

The above has described that the rotational-direction delayed side is likely to be demagnetized in a rotor having no skew in a permanent magnet type rotating electric machine. Next, a portion that is likely to be demagnetized in a rotor having skew will be described.

Figure 4:
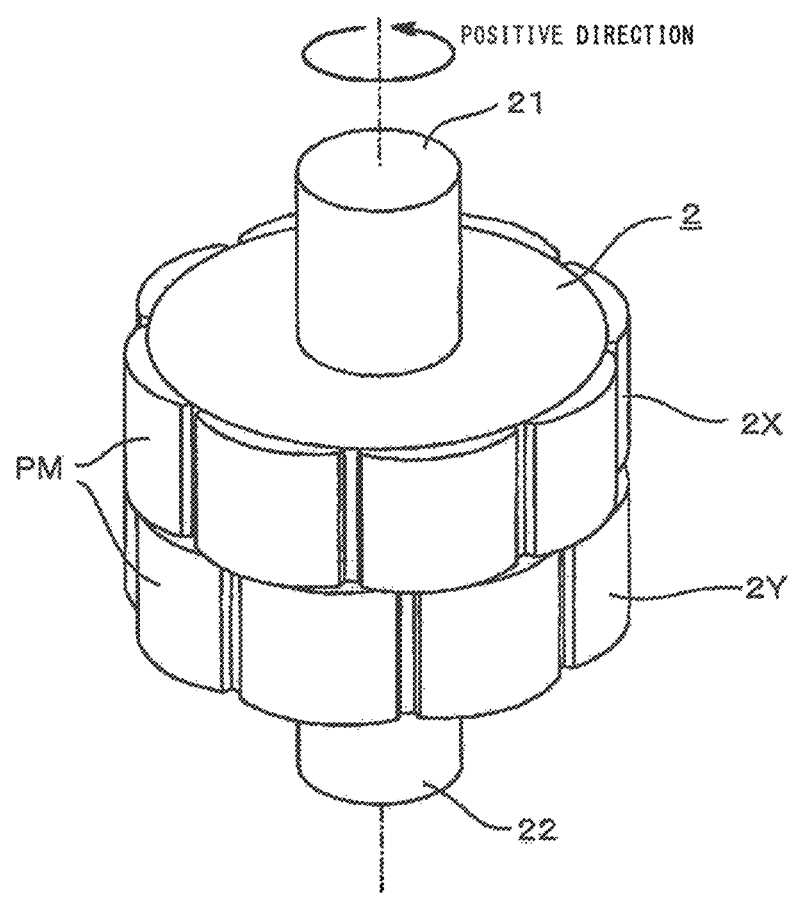
FIG. 4 is a perspective view showing a rotor having skew in a permanent magnet type rotating electric machine.

FIG. 4 shows a rotor 2 having two-stage skew in a permanent magnet type rotating electric machine. In the rotor 2 shown in FIG. 4, one axial end 21 is defined as an axial end A and the other axial end 22 is defined as an axial end B, and a counterclockwise direction as seen in a direction from the axial end A to the axial end B is referred to as a positive direction. In the entirety of the rotor 2, a part displaced in the positive direction by the two-stage skew is referred to as a rotor part 2X, and a part displaced in a negative direction is referred to as a rotor part 2Y. When the rotor 2 rotates in the positive direction, the rotor part 2X corresponds to a rotational-direction-advanced-side part and the rotor part 2Y corresponds to a rotational-direction-delayed-side part. Conversely, when the rotor 2 rotates in the negative direction, the rotor part 2X corresponds to a rotational-direction-delayed-side part and the rotor part 2Y corresponds to a rotational-direction-advanced-side part.

Figure 5A:
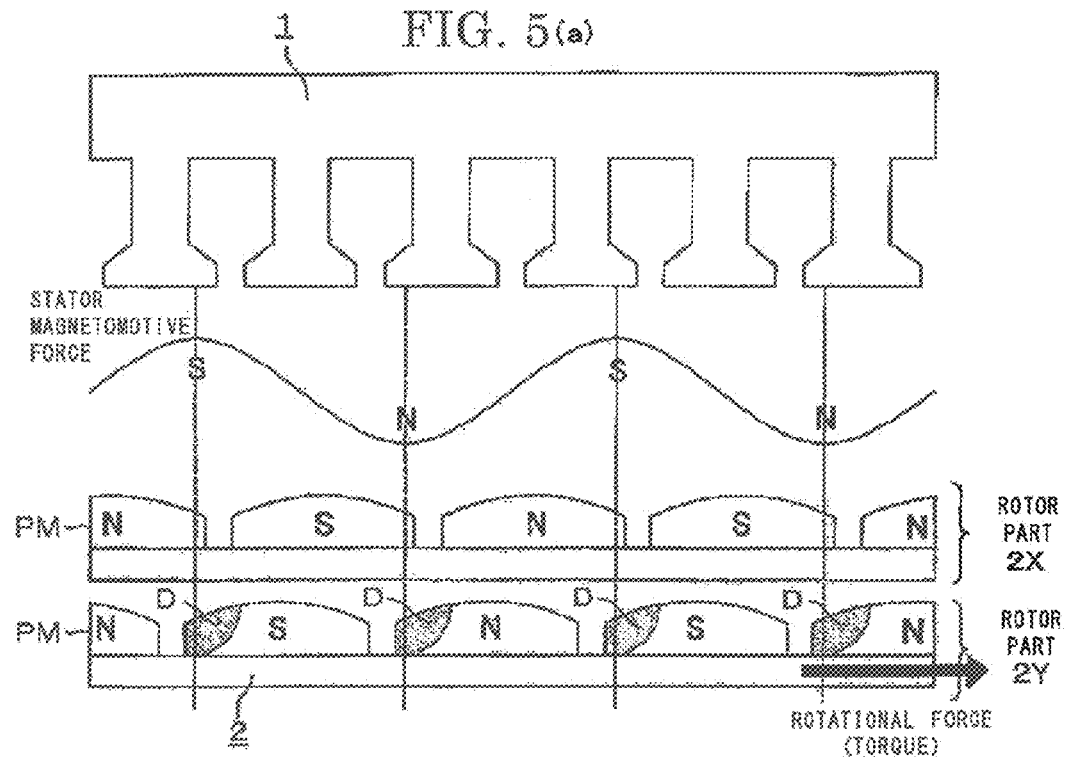
FIG. 5(a) is a schematic development diagram for explaining a stator magnetomotive force and a relative position of a rotor in the case where a permanent magnet type rotating electric machine with the rotor having skew is rotating in the positive direction.

FIG. 5 shows a schematic diagram for explaining a stator magnetomotive force and a relative position of the rotor 2 in the permanent magnet type rotating electric machine in which the rotor has skew. Current application is g-axis current application. FIG. 5(a) shows the case of rotation in the positive direction. Here, the rotor part 2Y delays relative to the rotor part 2X. As described in the rotor having no skew, demagnetization is likely to occur at the delayed side of a permanent magnet. In the rotor having two-stage skew, each delayed side in the rotor part 2Y is more likely to be demagnetized than in the rotor part 2X.

Figure 5B:
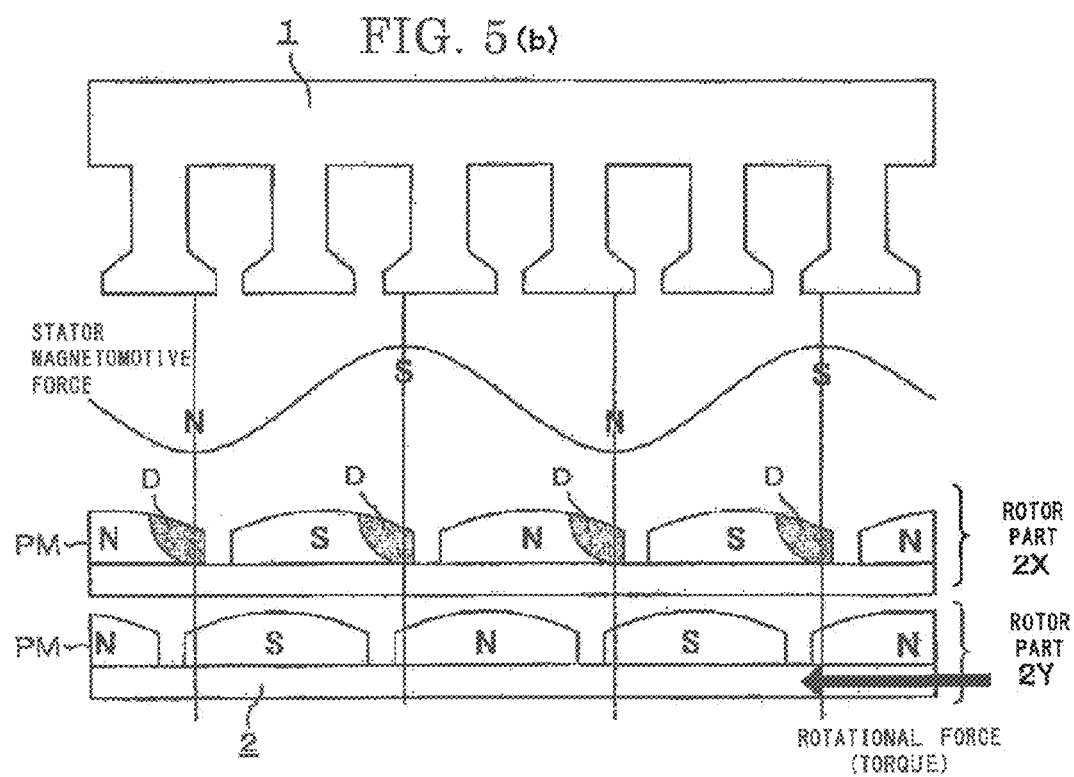
FIG. 5(b) is a schematic development diagram for explaining a stator magnetomotive force and a relative position of a rotor in the case where a permanent magnet type rotating electric machine with the rotor having skew is rotating in the negative direction.

FIG. 5(b) shows the case of rotation in the negative direction. Here, the advanced side and the delayed side are reversed from the case of rotation in the positive direction, that is, the rotor part 2X delays relative to the rotor part 2Y. In FIG. 5(b), since the rotor part 2X delays, each delayed side in the rotor part 2X is more likely to be demagnetized.

From a combination of the consideration on the rotation in the positive direction and the consideration on the rotation in the negative direction, it is found that, in the entirety of the rotor, demagnetization is likely to occur at the positive side portion in the rotor part 2X which is a part displaced in the positive direction, and at the negative side portion in the rotor part 2Y which is a part displaced in the negative direction.

In rotors having skew in conventional technique, a portion that becomes, due to the skew, particularly likely to be demagnetized as described above is not figured out, but normally, in order to improve resistance against demagnetization, a measure of increasing demagnetization resistance at both ends of each magnet is taken. Specifically, a measure of increasing the thicknesses of both ends of each magnet, thereby locally increasing a permeance coefficient of the magnet only at both ends thereof, or a measure of locally using a magnet having great coercivity at both ends thereof, is taken. Actually, in a rotor having skew, a portion that is likely to be demagnetized is not both ends of a magnet but one end of a magnet. Therefore, the above measures cause, more than necessary, increase in the magnet weight, increase in the number of magnet members, and expansion of a range in which magnet coercivity is increased.

Figure 6A:
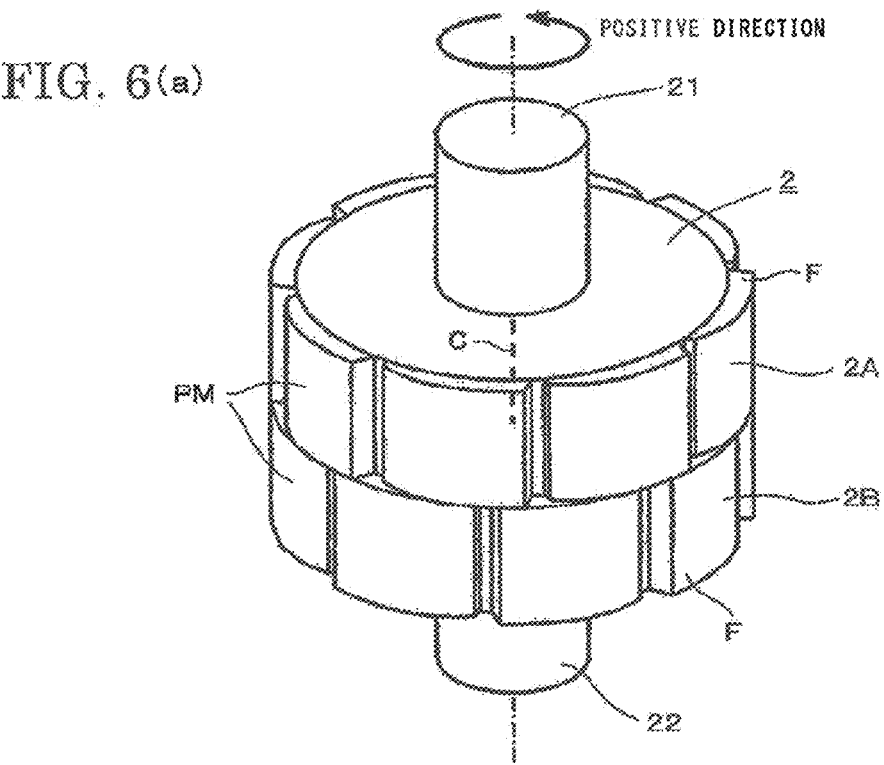
FIG. 6(a) is a perspective view of a rotor of a rotating electric machine according to embodiment 1.
Figure 6B:
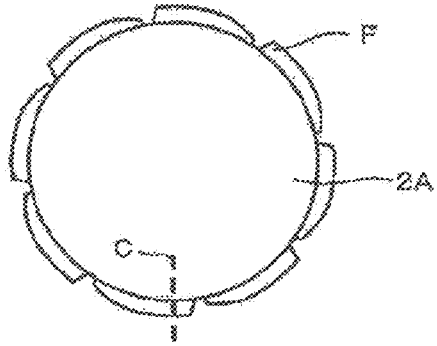
FIG. 6(b) is a schematic view showing a cross sectional shape at a part skewed in the positive direction of the rotor of the rotating electric machine according to embodiment 1.
Figure 6C:
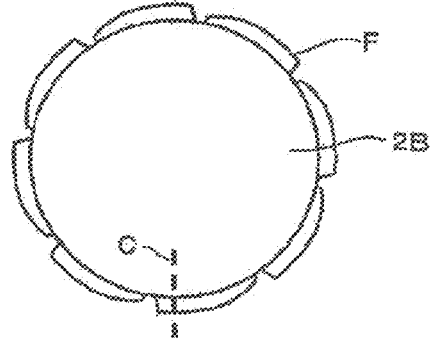
FIG. 6(c) is a schematic view showing a cross sectional shape at a part skewed in the negative direction of the rotor of the rotating electric machine according to embodiment 1.

FIG. 6 is a view of the rotor 2 of the permanent magnet type rotating electric machine according to embodiment 1. FIG. 6(a) shows a perspective view of the rotor 2, and FIG. 6(b) and FIG. 6(c) show sectional shapes at the respective parts of the rotor 2. As shown in FIG. 6(a), magnets forming magnetic poles in the rotor 2 are skewed at two stages in the axial direction.

As shown in FIG. 6, in the case where one axial end 21 is defined as an axial end A, the other axial end 22 is defined as an axial end B, and a counterclockwise direction as seen in a direction from the axial end A to the axial end B is referred to as a positive direction of the rotor, a part skewed in the positive direction is referred to as a rotor part 2A and a part skewed in a negative direction is referred to as a rotor part 2B.

FIG. 6(b) shows the rotor part 2A and FIG. 6(c) shows the rotor part 2B. In FIG. 6(a), FIG. 6(b), and FIG. 6(c), C indicates the center position among magnetic poles.

In the rotor part 2A skewed in the positive direction, the magnet thickness at a positive side end F is greater than that at a negative side end. In the rotor part 2B skewed in the negative direction, the magnet thickness at a negative side end F is greater than that at a positive side end. At a location where the magnet thickness is increased, since the gap length between the stator 1 and the rotor 2 is also shortened, a permeance coefficient of the magnet increases and demagnetization resistance is improved. At the above-specified portion that is likely to be demagnetized, that is, at a positive side portion F in the rotor part 2A skewed in the positive direction and a negative side portion F in the rotor part 2B skewed in the negative direction, the magnet thickness is increased to form a demagnetization resistance strengthened portion. Thus, while the rotor 2 has a skew effect, demagnetization resistance can be improved as a whole.

As compared to the case of thickening both ends of a magnet, the magnet weight can be reduced and the rotor can be obtained at low cost. Since only one end of each magnet is thickened, each magnet, the rotor part 2A, and the rotor part 2B individually have a structure asymmetric between forward and reverse rotations. However, since the rotor part 2A and the rotor part 2B have structures axisymmetric with each other, the entire rotor has a structure symmetric between forward and reverse rotations. Therefore, in the case of driving the rotating electric machine in both of forward and reverse rotations, controllability is improved.

Although FIG. 6 shows the case where the number of magnetic poles in the rotor is eight, the magnetic pole number is not limited to eight, but as a matter of course, any magnetic pole number may be employed.

Embodiment 1 has the following configuration and can provide the following effects.
(Configuration)

A rotating electric machine includes: a stator having a stator iron core and a winding; and a rotor 2 having permanent magnets PM forming a plurality of magnet poles distributed along the circumferential direction on the outer circumferential surface of a cylindrical rotor body.

In the rotor 2, an axial end 21 at one side of the rotating electric machine is defined as A, the other axial end 22 is defined as B, and a counterclockwise direction as seen in a direction from A to B is defined as a positive direction of a mechanical angle indicating a magnetic pole position.

In the rotor part 2A composing a part in the axial direction of the rotor 2, each magnetic pole position is displaced in the positive direction with respect to each magnetic pole center C in average of the entirety in the axial direction of the rotor 2, and in the rotor part 2B composing a part in the axial direction of the rotor 2 at a different position in the axial direction from that of the rotor part 2A, each magnetic pole position is displaced in the negative direction with respect to each magnetic pole center C in average of the entirety in the axial direction of the rotor 2, whereby the entire magnetic poles in the rotor 2 are formed.

Each permanent magnet PM in the rotor part 2A composing the part displaced in the positive direction of the rotor 2 is configured such that a positive side end F in the circumferential direction of the magnet PM has a greater thickness than a negative side end, thereby forming a demagnetization resistance strengthened portion.

Each permanent magnet PM forming the magnetic pole in the rotor part 2B composing the part displaced in the negative direction of the rotor 2 is configured such that a negative side end F in the circumferential direction of the magnet PM has a greater thickness than a positive side end, thereby forming a demagnetization resistance strengthened portion.
(Effects)
(1) To obtain a rotor and a rotating electric machine that hardly cause demagnetization while having a skew effect.
(2) To obtain a rotor and a rotating electric machine that are symmetric between forward and reverse rotations.
(3) To obtain a rotor and a rotating electric machine with reduced magnet weight and reduced cost by increasing the thickness of each magnet only at a portion that is likely to be demagnetized.

Embodiment 2

Figure 7A:
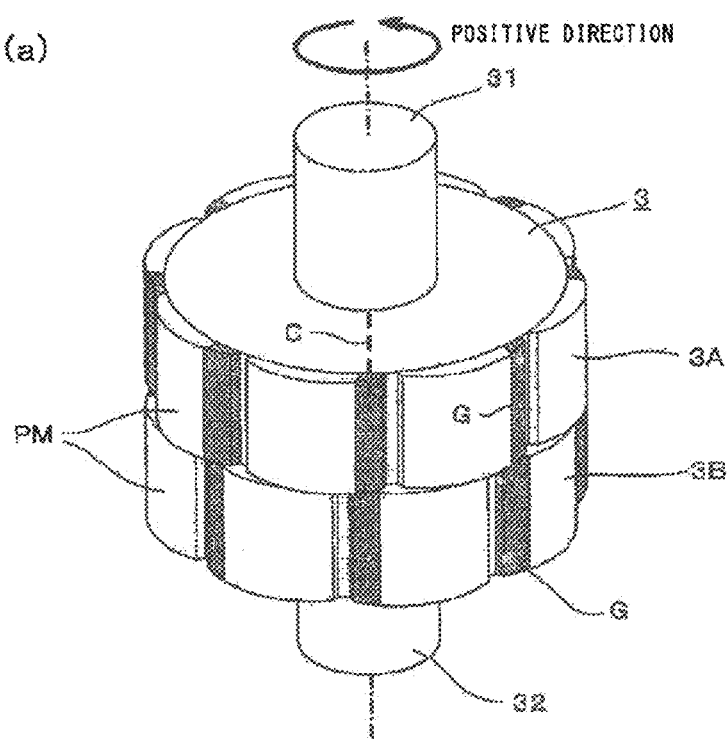
FIG. 7(a) is a perspective view of a rotor of a rotating electric machine according to embodiment 2.
Figure 7B:
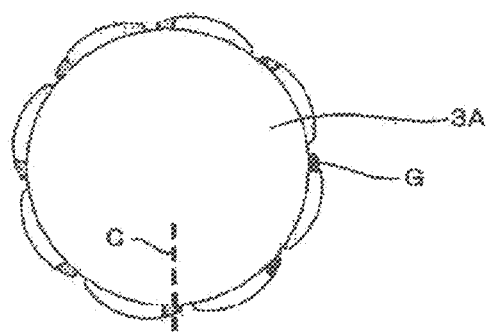
FIG. 7(b) is a schematic view showing a cross sectional shape at a part skewed in the positive direction of the rotor of the rotating electric machine according to embodiment 2.
Figure 7C:
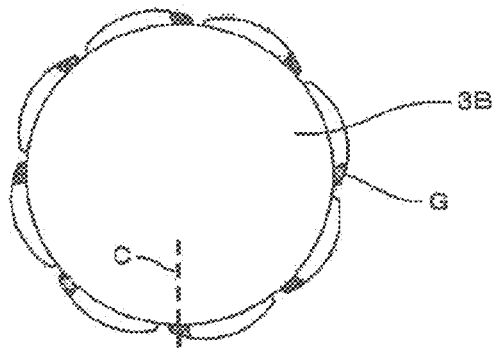
FIG. 7(c) is a schematic view showing a cross sectional shape at a part skewed in the negative direction of the rotor of the rotating electric machine according to embodiment 2.
Figure 8A:
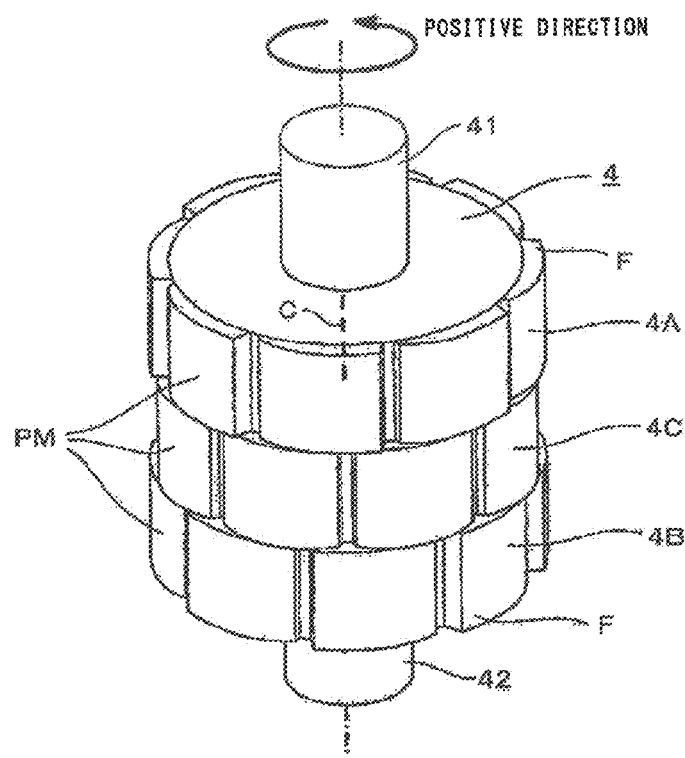
FIG. 8(a) is a perspective view of a rotor having three-stage skew in a rotating electric machine according to embodiment 3.
Figure 8B:
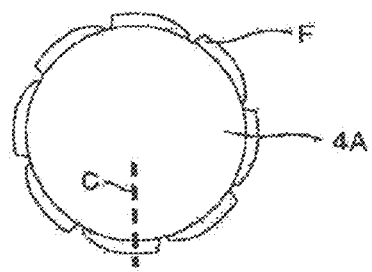
FIG. 8(b) is a schematic view showing a cross sectional shape at a part skewed in the positive direction of the rotor of the rotating electric machine according to embodiment 3.
Figure 8C:
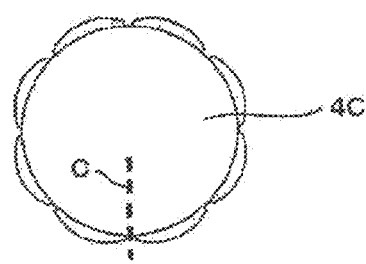
FIG. 8(c) is a schematic view showing a cross sectional shape at a part not skewed of the rotor of the rotating electric machine according to embodiment 3.
Figure 8D:
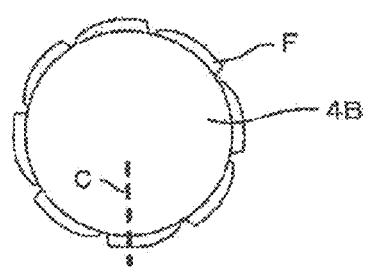
FIG. 8(d) is a schematic view showing a cross sectional shape at a part skewed in the negative direction of the rotor of the rotating electric machine according to embodiment 3.

Embodiment 2 according to the present invention will be described with reference to FIG. 7. FIG. 7 is a diagram for explaining the configuration of a rotor of a permanent magnet type rotating electric machine according to embodiment 2. FIG. 7(*a*) shows a perspective view of a rotor 3, and FIG. 7(*b*) and FIG. 7(*c*) show cross sectional shapes at respective parts of the rotor.

As shown in FIG. 7(*a*), magnets forming magnetic poles in the rotor 3 are skewed at two stages in the axial direction. As shown in FIG. 7, in the case where one axial end is defined as an axial end 31, the other axial end is defined as an axial end 32, and a counterclockwise direction as seen in a direction from the axial end 31 to the axial end 32 is referred to as a positive direction of the rotor 3, a part skewed in the positive direction is referred to as a rotor part 3A and a part skewed in a negative direction is referred to as a rotor part 3B.

FIG. 7(*b*) shows a cross sectional shape of the rotor part 3A, and FIG. 7(*c*) shows a cross sectional shape of the rotor part 3B. In FIG. 7(*a*), FIG. 7(*b*), and FIG. 7(*c*), C indicates the center position among magnetic poles.

In the rotor part 3A skewed in the positive direction, the magnet coercivity at a positive side end is greater than that at a negative side end. In the rotor part 3B skewed in the negative direction, the magnet coercivity at a negative side end is greater than that at a positive side end. In the figure, a portion where coercivity is increased is hatched and indicated by a character G.

As means for increasing coercivity at an end of each magnet, a single magnet having great coercivity only at its end may be used, or a plurality of members having different coercivities may be used, that is, magnets having great coercivities may be placed at respective ends where coercivity is to be increased. By locally using a magnet material having great coercivity at a portion that is likely to be demagnetized, it becomes unnecessary to use a magnet having coercivity increased more than necessary, e.g., a magnet having great coercivity at both ends or over the entirety, and therefore a rotor is obtained at low cost. Generally, a residual magnet density of a magnet becomes small as coercivity is increased. Therefore, not increasing coercivity more than necessary also provides an effect of increasing a magnetic flux of a magnet.

Embodiment 2 has the following configuration and can provide the following effects.
(Configuration)

A rotating electric machine includes: a stator having a stator iron core and a winding; and a rotor 3 having permanent magnets PM forming a plurality of magnet poles distributed along the circumferential direction on the outer circumferential surface of a cylindrical rotor body.

In the rotor 3, an axial end 31 at one side of the rotating electric machine is defined as A, the other axial end 32 is defined as B, and a counterclockwise direction as seen in a direction from A to B is defined as a positive direction of a mechanical angle indicating a magnetic pole position.

In the rotor part 3A composing a part in the axial direction of the rotor 3, each magnetic pole position is displaced in the positive direction with respect to each magnetic pole center C in average of the entirety in the axial direction of the rotor 3, and in the rotor part 3B composing a part in the axial direction of the rotor 3 at a different position in the axial direction from that of the rotor part 3A, each magnetic pole position is displaced in the negative direction with respect to each magnetic pole center C in average of the entirety in the axial direction of the rotor 3, whereby the entire magnetic poles in the rotor 3 are formed.

Each permanent magnet PM in the rotor part 2A composing the part displaced in the positive direction of the rotor 3 is configured such that a positive side end G in the circumferential direction of the magnet PM has greater coercivity than a negative side end, thereby forming a demagnetization resistance strengthened portion.

Each permanent magnet PM forming the magnetic pole in the rotor part 2B composing the part displaced in the negative direction of the rotor 2 is configured such that a negative side end G in the circumferential direction of the magnet PM has greater coercivity than a positive side end, thereby forming a demagnetization resistance strengthened portion.

(Effects)
(1) To obtain a rotor and a rotating electric machine that hardly cause demagnetization while having a skew effect.
(2) To obtain a rotor and a rotating electric machine that are symmetric between forward and reverse rotations.
(3) To obtain a rotor and a rotating electric machine with reduced cost in which magnet coercivity is not increased more than necessary, by increasing coercivity only at a portion that is likely to be demagnetized.

Embodiment 3

Embodiment 3 according to the present invention will be described with reference to FIG. 8. FIG. 8 is a perspective view of a rotor of a permanent magnet type rotating electric machine according to embodiment 3, and schematic views showing cross sectional shapes at respective parts of the rotor.

In the above embodiment 1, the case where the rotor of the permanent magnet type rotating electric machine has skew with two parts of the rotor connected in the axial direction has been shown. However, the present invention is also applicable to the case where parts at three or more stages are connected. From the same consideration as in the above, regardless of the number of skewed parts in the rotor, when the parts are seen in the axial direction, a positive side portion of each magnet in a part skewed in the positive direction with respect to the magnetic pole position in the entirety of the rotor, and a negative side portion of each magnet in a part skewed in the negative direction with respect to the magnetic pole position in the entirety of the rotor, are likely to be demagnetized.

FIG. 8 shows the rotor having three-stage skew according to embodiment 3. FIG. 8(a) shows a perspective view of a rotor 4. FIG. 8(b), FIG. 8(c), and FIG. 8(d) show sectional shapes at respective parts of the rotor 4, i.e., a rotor part 4A, a rotor part 4B, and a rotor part 4C. The rotor part 4A is skewed in the positive direction, the rotor part 4B is skewed in the negative direction, and the position of each magnet pole in the rotor part 4C coincides with the magnet pole position in the entirety of the rotor.

The positive skew angle in the rotor part 4A and the negative skew angle in the rotor part 4B are the same. Portions that are most likely to be demagnetized in the rotor 4 are a positive side portion F in the rotor part 4A and a negative side portion F in the rotor part 4B. The magnet thickness at the positive side portion F in the rotor part 4A, which is likely to be demagnetized, and the magnet thickness at the negative side portion F in the rotor part 4B, which is likely to be demagnetized, are increased, whereby the same effect as in the rotor 2 described in embodiment 1 is obtained. Further, since the number of skew stages is increased, a rotor in which torque pulsation such as cogging torque or torque ripple is suppressed is obtained.

In the above description, the rotor having three-stage skew has been shown, but the present invention is also applicable to the case of having skew at four or more stages. That is, when the parts are seen in the axial direction, a positive side portion of each magnet in a part skewed in the positive direction, and a negative side portion of each magnet in a part skewed in the negative direction, are likely to be demagnetized. Therefore, by increasing the magnet thickness at these portions, demagnetization resistance can be improved while the rotor has a skew effect.

Embodiment 3 has the following configuration and can provide the following effects.

(Configuration)
A rotating electric machine includes: a stator having a stator iron core and a winding; and a rotor 4 having permanent magnets PM forming a plurality of magnet poles distributed along the circumferential direction on the outer circumferential surface of a cylindrical rotor body.

The rotor 4 is composed of rotor parts 4A, 4B, 4C . . . having skew at three or more stages.

In the rotor 4, an axial end 41 at one side of the rotating electric machine is defined as A, the other axial end 42 is defined as B, and a counterclockwise direction as seen in a direction from A to B is defined as a positive direction of a mechanical angle indicating a magnetic pole position.

In the rotor part 4A composing a part in the axial direction of the rotor 4, each magnetic pole position is displaced in the positive direction with respect to each magnetic pole center C in average of the entirety in the axial direction of the rotor 4.

In the rotor part 4B composing a part in the axial direction of the rotor 4 at a different position in the axial direction from that of the rotor part 4A, each magnetic pole position is displaced in the negative direction with respect to each magnetic pole center C in average of the entirety in the axial direction of the rotor 4.

Each magnetic pole position in the rotor part 4C composing a part in the axial direction of the rotor 4 at a different position in the axial direction from those of the rotor part 4A and the rotor part 4B coincides with each magnetic pole center C, and the rotor part 4C is disposed between the rotor part 4A and the rotor part 4B, whereby the entire magnetic poles in the rotor 4 are formed.

Each permanent magnet PM in the rotor part 4A composing the part displaced in the positive direction of the rotor 4 is configured such that a positive side end F in the circumferential direction of the magnet PM has a greater thickness than a negative side end, thereby forming a demagnetization resistance strengthened portion.

Each permanent magnet PM forming the magnetic pole in the rotor part 4B composing the part displaced in the negative direction of the rotor 4 is configured such that a negative side end F in the circumferential direction of the magnet PM has a greater thickness than a positive side end, thereby forming a demagnetization resistance strengthened portion.

(Effects)
(1) To obtain a rotor and a rotating electric machine that hardly cause demagnetization while having a skew effect.
(2) To obtain a rotor and a rotating electric machine that are symmetric between forward and reverse rotations.
(3) To obtain a rotor and a rotating electric machine with reduced magnet weight and reduced cost by increasing the thickness of each magnet only at a portion that is likely to be demagnetized.
(4) To obtain an increased skew effect.

Embodiment 4

Figure 9:
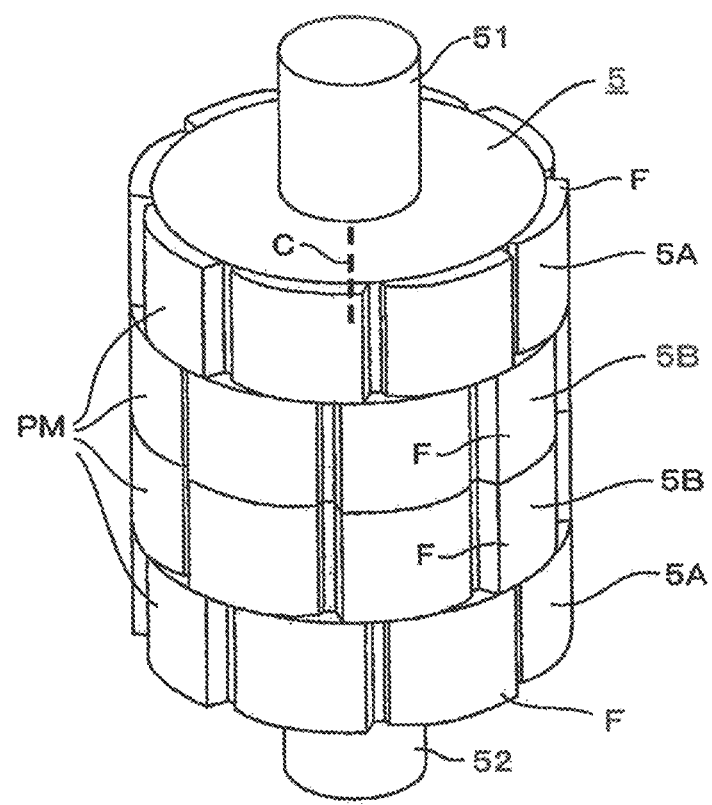
FIG. 9 is a perspective view of a rotor of a rotating electric machine according to embodiment 4, in which a part skewed in the positive direction and a part skewed in the negative direction are alternately connected in the axial direction.

Embodiment 4 according to the present invention will be described with reference to FIG. 9. FIG. 9 is a perspective view of a rotor of a permanent magnet type rotating electric machine according to embodiment 4.

FIG. 9 shows a rotor 5 according to embodiment 4 in which a rotor part 5A composing a part skewed in the positive direction with respect to the magnetic pole position in the entirety of the rotor, and a rotor part 5B composing a part skewed in the negative direction with respect to the magnetic pole position in the entirety of the rotor are alternately connected in the axial direction. As shown in FIG. 9, the magnet thickness at a positive side portion F in the rotor part 5A composing a part skewed in the positive direction, and the magnet thickness at a negative side portion F in the rotor part 5B composing a part skewed in the negative direction, are increased, whereby the same effect as in the rotor 2 described in embodiment 1 is obtained. Further, since the structure is symmetric also in the axial direction, occurrence of thrust force is prevented, whereby an effect of prolonging the life of a bearing is also obtained.

Embodiment 4 has the following configuration and can provide the following effects.

(Configuration)

A rotating electric machine includes: a stator having a stator iron core and a winding; and a rotor 5 having permanent magnets PM forming a plurality of magnet poles distributed along the circumferential direction on the outer circumferential surface of a cylindrical rotor body.

In the rotor 5, an axial end 51 at one side of the rotating electric machine is defined as A, the other axial end 52 is defined as B, and a counterclockwise direction as seen in a direction from A to B is defined as a positive direction of a mechanical angle indicating a magnetic pole position.

In the rotor part 5A composing a part in the axial direction of the rotor 5, each magnetic pole position is displaced in the positive direction with respect to each magnetic pole center C in average of the entirety in the axial direction of the rotor 5.

In the rotor part 5B composing a part in the axial direction of the rotor 4 at a different position in the axial direction from that of the rotor part 5A, each magnetic pole position is displaced in the negative direction with respect to each magnetic pole center C in average of the entirety in the axial direction of the rotor 5.

A plurality of the rotor parts 5A and a plurality of the rotor parts 5B are disposed at positions different in the axial direction, and at least some of, that is, all or some of the plurality of rotor parts 5B are disposed among the plurality of rotor parts 5A, whereby the entire magnetic poles in the rotor 5 are formed.

Each permanent magnet PM in the part displaced in the positive direction of the rotor 5 is configured such that a positive side end F in the circumferential direction of the magnet PM has a greater thickness than a negative side end, thereby forming a demagnetization resistance strengthened portion.

Each permanent magnet PM forming the magnetic pole in the part displaced in the negative direction of the rotor 4 is configured such that a negative side end F in the circumferential direction of the magnet PM has a greater thickness than a positive side end, thereby forming a demagnetization resistance strengthened portion.

(Effects)

(1) To obtain a rotor and a rotating electric machine that hardly cause demagnetization while having a skew effect.
(2) To obtain a rotor and a rotating electric machine that are symmetric between forward and reverse rotations.
(3) To obtain a rotor and a rotating electric machine with reduced magnet weight and reduced cost by increasing the thickness of each magnet only at a portion that is likely to be demagnetized.
(4) To obtain an increased skew effect, and reduce a thrust force.

Embodiment 5

Figure 10A:
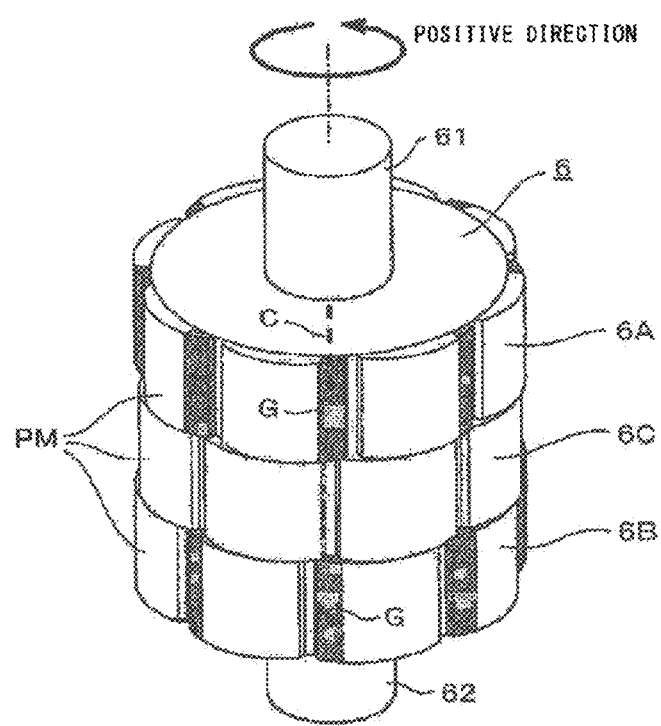
FIG. 10(a) is a perspective view of a rotor having three-stage skew in a rotating electric machine according to embodiment 5.
Figure 10B:
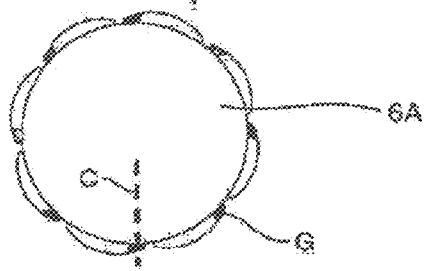
FIG. 10(b) is a schematic view showing a cross sectional shape at a part skewed in the positive direction of the rotor of the rotating electric machine according to embodiment 5.
Figure 10C:
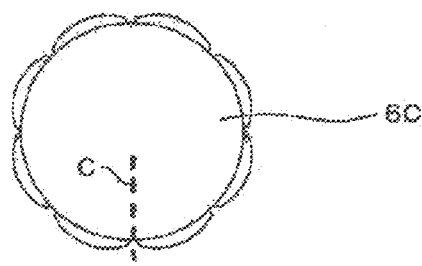
FIG. 10(c) is a schematic view showing a cross sectional shape at a part not skewed of the rotor of the rotating electric machine according to embodiment 5.
Figure 10D:
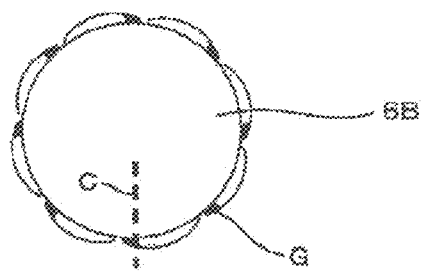
FIG. 10(d) is a schematic view showing a cross sectional shape at a part skewed in the negative direction of the rotor of the rotating electric machine according to embodiment 5.

Embodiment 5 according to the present invention will be described with reference to FIG. 10. FIG. 10 shows a rotor 6 having three-stage skew according to embodiment 5. FIG. 10(a) shows a perspective view of a rotor 6. FIG. 10(b), FIG. 10(c), and FIG. 10(d) show sectional shapes at respective parts of the rotor 6, i.e., a rotor part 6A, a rotor part 6B, and a rotor part 6C. With respect to the magnetic pole position in the entirety of the rotor, the rotor part 6A is skewed in the positive direction, and the rotor part 6B is skewed in the negative direction. The position of each magnet pole in the rotor part 6C coincides with the magnet pole position in the entirety of the rotor. The positive skew angle in the rotor part 6A and the negative skew angle in the rotor part 6B are the same.

Portions that are most likely to be demagnetized in the rotor 6 are a positive side portion G in the rotor part 6A and a negative side portion G in the rotor part 6B. Coercivity at the positive side portion G in the rotor part 6A, which is likely to be demagnetized, and coercivity at the negative side portion G in the rotor part 6B, which is likely to be demagnetized, are increased to form demagnetization resistance strengthened portions, whereby the same effect as in the rotor 3 described in embodiment 2 is obtained. Further, since the number of skew stages is increased, a rotor in which torque pulsation such as cogging torque or torque ripple is suppressed is obtained.

In the above description, the rotor having three-stage skew has been shown, but the same holds true also for the case of having skew at four or more stages. That is, when the parts are seen in the axial direction, a positive side portion of each magnet in a part skewed in the positive direction, and a negative side portion of each magnet in a part skewed in the negative direction, are likely to be demagnetized. Therefore, by increasing coercivity at these portions, demagnetization resistance can be improved while the rotor has a skew effect.

Embodiment 5 has the following configuration and can provide the following effects.

(Configuration)

A rotating electric machine includes: a stator having a stator iron core and a winding; and a rotor 6 having permanent magnets PM forming a plurality of magnet poles distributed along the circumferential direction on the outer circumferential surface of a cylindrical rotor body.

The rotor 6 is composed of rotor parts 6A, 6B, 6C . . . having skew at three or more stages.

In the rotor 6, an axial end 61 at one side of the rotating electric machine is defined as A, the other axial end 62 is defined as B, and a counterclockwise direction as seen in a direction from A to B is defined as a positive direction of a mechanical angle indicating a magnetic pole position.

In the rotor part 4A composing a part in the axial direction of the rotor 6, each magnetic pole position is displaced in the positive direction with respect to each magnetic pole center C in average of the entirety in the axial direction of the rotor 6.

In the rotor part 6B composing a part in the axial direction of the rotor 6 at a different position in the axial direction from that of the rotor part 6A, each magnetic pole position is displaced in the negative direction with respect to each magnetic pole center C in average of the entirety in the axial direction of the rotor 6.

Each magnetic pole position in the rotor part 4C composing a part in the axial direction of the rotor 6 at a different position in the axial direction from those of the rotor part 6A and the rotor part 6B coincides with each magnetic pole center C, and the rotor part 4C is disposed between the rotor part 6A and the rotor part 6B, whereby the entire magnetic poles in the rotor 6 are formed.

Each permanent magnet PM forming the magnetic pole in the rotor part 6A composing the part displaced in the positive direction of the rotor 6 is configured such that a positive side end G in the circumferential direction of the magnet PM has greater coercivity than a negative side end, thereby forming a demagnetization resistance strengthened portion.

Each permanent magnet PM forming the magnetic pole in the rotor part 6B composing the part displaced in the negative direction of the rotor 4 is configured such that a negative side end G in the circumferential direction of the magnet PM has greater coercivity than a positive side end, thereby forming a demagnetization resistance strengthened portion.

(Effects)
(1) To obtain a rotor and a rotating electric machine that hardly cause demagnetization while having a skew effect.
(2) To obtain a rotor and a rotating electric machine that are symmetric between forward and reverse rotations.
(3) To obtain a rotor and a rotating electric machine with reduced magnet weight and reduced cost by increasing coercivity of each magnet only at a portion that is likely to be demagnetized.
(4) To obtain an increased skew effect.

Embodiment 6

Figure 11:
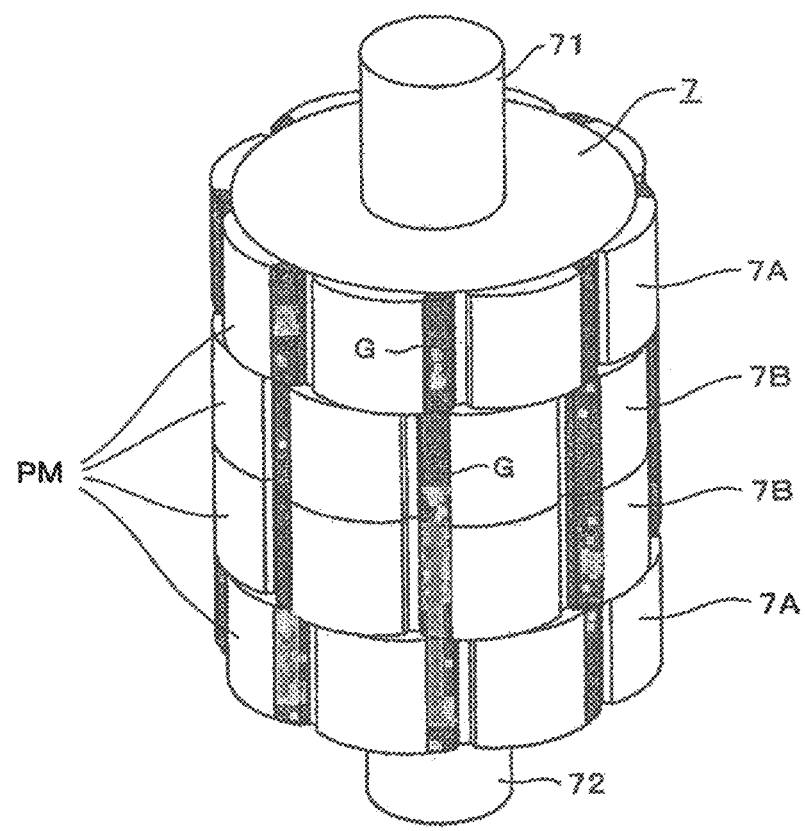
FIG. 11 is a perspective view of a rotor of a rotating electric machine according to embodiment 6, in which a part skewed in the positive direction and a part skewed in the negative direction are alternately connected in the axial direction.

Embodiment 6 according to the present invention will be described with reference to FIG. 11. FIG. 11 shows a rotor 7 according to embodiment 6 in which a rotor part 7A composing a part skewed in the positive direction with respect to the magnetic pole position in the entirety of the rotor, and a rotor part 7B composing a part skewed in the negative direction with respect to the magnetic pole position in the entirety of the rotor are alternately connected in the axial direction.

As shown in FIG. 11, the magnet coercivity at a positive side portion of each permanent magnet PM forming the magnetic pole in the rotor part 7A composing a part skewed in the positive direction, and the magnet coercivity at a negative side portion of each permanent magnet PM forming the magnetic pole in the rotor part 7B composing a part skewed in the negative direction, are increased (the portions having great coercivity are indicated by a character G) to form demagnetization resistance strengthened portions, whereby the same effect as in the rotor 3 described in embodiment 2 is obtained. Further, since the structure is symmetric also in the axial direction, occurrence of thrust force is prevented, whereby the life of a bearing can be prolonged.

Embodiment 6 has the following configuration and can provide the following effects.
(Configuration)
A rotating electric machine includes: a stator having a stator iron core and a winding; and a rotor 7 having permanent magnets PM forming a plurality of magnet poles distributed along the circumferential direction on the outer circumferential surface of a cylindrical rotor body.

In the rotor 7, an axial end 71 at one side of the rotating electric machine is defined as A, the other axial end 72 is defined as B, and a counterclockwise direction as seen in a direction from A to B is defined as a positive direction of a mechanical angle indicating a magnetic pole position.

In the rotor part 7A composing a part in the axial direction of the rotor 7, each magnetic pole position is displaced in the positive direction with respect to each magnetic pole center C in average of the entirety in the axial direction of the rotor 7.

In the rotor part 7B composing a part in the axial direction of the rotor 7 at a different position in the axial direction from that of the rotor part 7A, each magnetic pole position is displaced in the negative direction with respect to each magnetic pole center C in average of the entirety in the axial direction of the rotor 7.

A plurality of the rotor parts 7A and a plurality of the rotor parts 7B are disposed at positions different in the axial direction, and at least some of, that is, all or some of the plurality of rotor parts 7B and 7B are disposed among the plurality of rotor parts 7A and 7A, whereby the entire magnetic poles in the rotor 7 are formed.

Each permanent magnet PM in the rotor part 7A composing the part displaced in the positive direction of the rotor 7 is configured such that a positive side end G in the circumferential direction of the magnet PM has greater coercivity than a negative side end, thereby forming a demagnetization resistance strengthened portion.

Each permanent magnet PM forming the magnetic pole in the rotor part 7B composing the part displaced in the negative direction of the rotor 7 is configured such that a negative side end G in the circumferential direction of the magnet PM has greater coercivity than a positive side end, thereby forming a demagnetization resistance strengthened portion.

(Effects)
(1) To obtain a rotor and a rotating electric machine that hardly cause demagnetization while having a skew effect.
(2) To obtain a rotor and a rotating electric machine that are symmetric between forward and reverse rotations.
(3) To obtain a rotor and a rotating electric machine with reduced magnet weight and reduced cost by increasing coercivity of each magnet only at a portion that is likely to be demagnetized.
(4) To obtain an increased skew effect, and reduce a thrust force.

Embodiment 7

Embodiment 7 according to the present invention will be described with reference to FIG. 12.

Figure 12A:
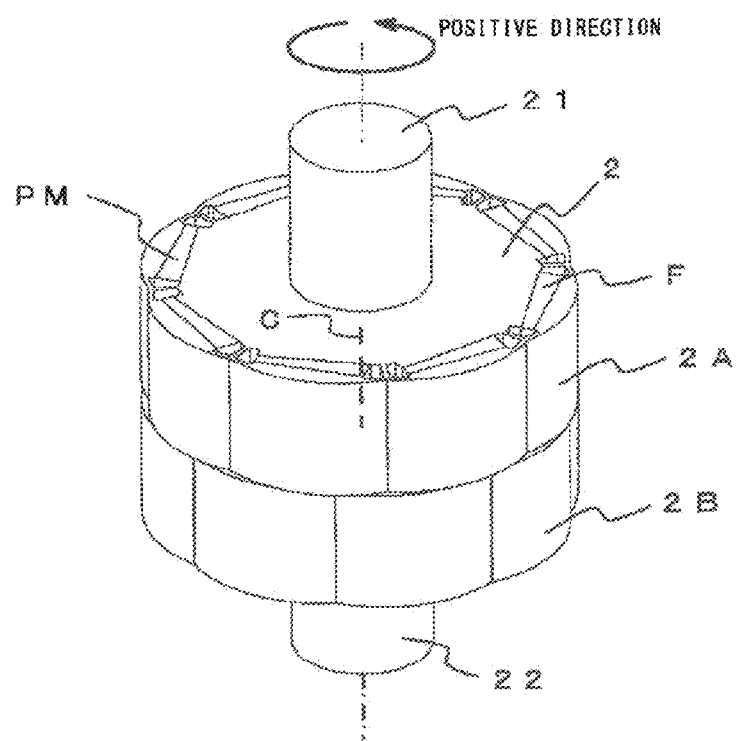
FIG. 12(a) is a perspective view of a rotor of a rotating electric machine according to embodiment 7.
Figure 12B:
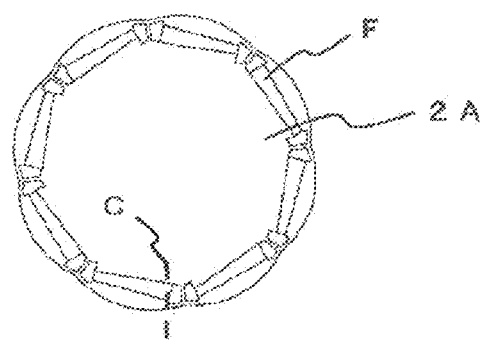
FIG. 12(b) is a schematic view showing a cross sectional shape at a part skewed in the positive direction of the rotor of the rotating electric machine according to embodiment 1.
Figure 12C:
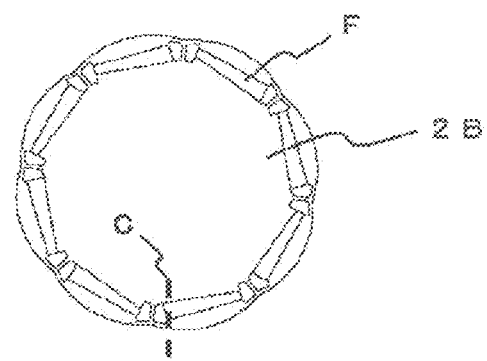
FIG. 12(c) is a schematic view showing a cross sectional shape at a part skewed in the negative direction of the rotor of the rotating electric machine according to embodiment 1.

FIG. 12 shows a rotor of an interior magnet type rotating electric machine. In the rotor 2, permanent magnets PM forming magnetic poles are embedded in respective rotor iron cores composing the rotor parts 2A and 2B.

That is, as shown in FIG. 12, a plurality of (in FIG. 12, eight) holes are formed, being spaced from each other, along the circumferential direction, inside the outer circumferential surface of each rotor iron core composing the rotor parts 2A and 2B, and the permanent magnets PM are interposed in the respective holes.

Also in this case, as in embodiment 1, in the rotor part 2A skewed in the positive direction, the magnet thickness at a positive side end F is greater than that at a negative side end. In the rotor part 2B skewed in the negative direction, the magnet thickness at a negative side end F is greater than that at a positive side end.

In embodiment 1, a surface magnet type rotating electric machine has been described in FIG. 6. However, the effect shown in embodiment 1 is exerted not only for a surface magnet type rotating electric machine, but the same effect is exerted also for an interior magnet type rotating electric machine.

In addition, embedding the permanent magnets in the rotor iron core further improves demagnetization resistance. This is because a part of a magnetic flux due to a stator magnetomotive force, which causes demagnetization of the permanent magnets, passes through the rotor iron core at the radially outward side of the permanent magnets, and therefore influence on the permanent magnets is reduced.

Thus, by using a rotor of interior magnet type, it becomes possible to obtain a rotating electric machine with further increased demagnetization resistance.

Embodiment 8

Embodiment 8 according to the present invention will be described with reference to FIG. 13.

Figure 13A:
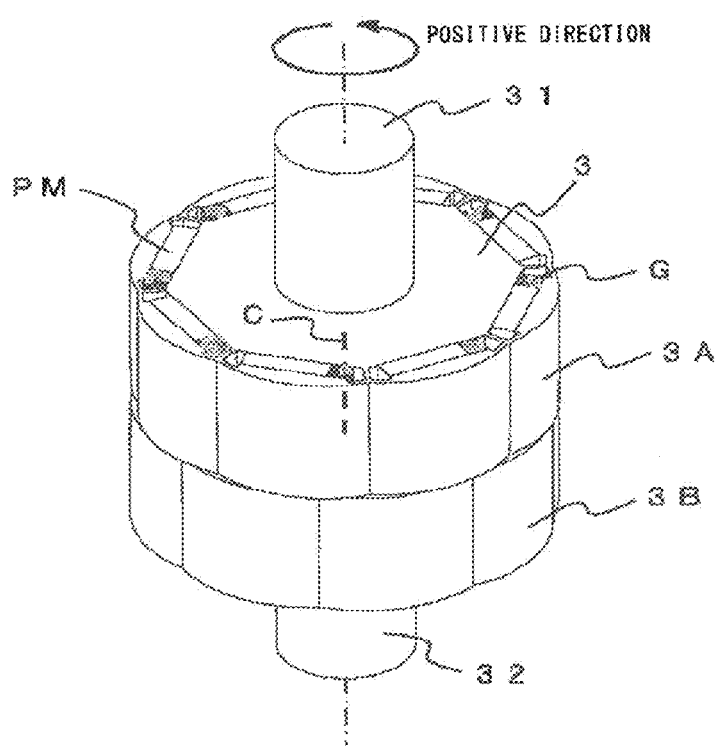
FIG. 13(a) is a perspective view of a rotor of a rotating electric machine according to embodiment 8.
Figure 13B:
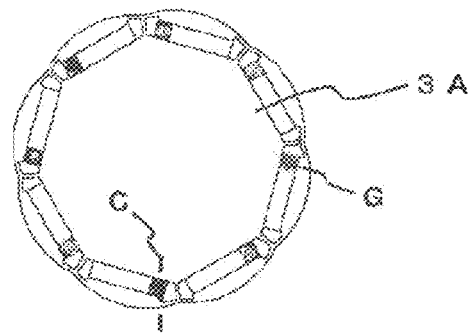
FIG. 13(b) is a schematic view showing a cross sectional shape at a part skewed in the positive direction of the rotor of the rotating electric machine according to embodiment 1.
Figure 13C:
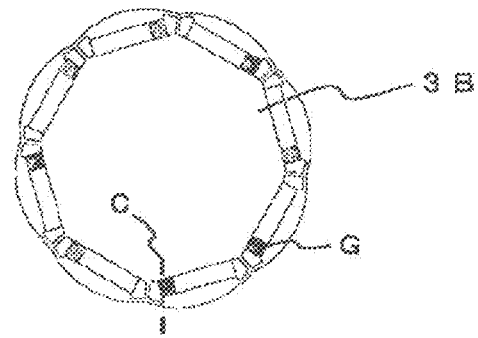
FIG. 13(c) is a schematic view showing a cross sectional shape at a part skewed in the negative direction of the rotor of the rotating electric machine according to embodiment 1.

FIG. 13 shows a rotor of an interior magnet type rotating electric machine. In the rotor 2, permanent magnets PM forming magnetic poles are embedded in respective rotor iron cores composing the rotor parts 2A and 2B.

That is, as shown in FIG. 13, a plurality of (in FIG. 13, eight) holes are formed, being spaced from each other, along the circumferential direction, inside the outer circumferential surface of each rotor iron core composing the rotor parts 2A and 2B, and the permanent magnets PM are interposed in the respective holes.

Also in this case, as in embodiment 2, in the rotor part 3A skewed in the positive direction, the magnet coercivity at a positive side end is greater than that at a negative side end. In the rotor part 3B skewed in the negative direction, the magnet coercivity at a negative side end is greater than that at a positive side end. In the figure, a portion where coercivity is increased is hatched and indicated by a character G.

In embodiment 2, a surface magnet type rotating electric machine has been described in FIG. 7. However, the effect shown in embodiment 2 is exerted not only for a surface magnet type rotating electric machine, but the same effect is exerted also for an interior magnet type rotating electric machine.

In addition, as described in embodiment 7, embedding the permanent magnets in the rotor iron core further improves demagnetization resistance.

As described thus far, the permanent magnet type rotating electric machine according to the present invention includes: a stator having a stator iron core and a winding; and a rotor having permanent magnets forming a plurality of magnet poles distributed along the circumferential direction on the outer circumferential surface of a cylindrical rotor body. The rotor is configured such that, in the case where an axial end at one side of the rotating electric machine is defined as A, the other axial end is defined as B, and a counterclockwise direction as seen in a direction from A to B is defined as a positive direction of a mechanical angle indicating a magnetic pole position, in a part in the axial direction of the rotor, each magnetic pole position is displaced in the positive direction with respect to each magnetic pole center in average of the entirety in the axial direction of the rotor, and in another part in the axial direction of the rotor, each magnetic pole position is displaced in the negative direction with respect to each magnetic pole center in average of the entirety in the axial direction of the rotor, whereby the entire magnetic poles in the rotor are formed. Each permanent magnet in the part displaced in the positive direction of the rotor is configured such that a positive side end in the circumferential direction of each magnet pole has a greater thickness or greater coercivity than a negative side end, thereby forming a demagnetization resistance strengthened portion. Each permanent magnet in the part displaced in the negative direction of the rotor is configured such that a negative side end in the circumferential direction of each magnet pole has a greater thickness or greater coercivity than a positive side end, thereby forming a demagnetization resistance strengthened portion. Therefore, the following effect is obtained.

It becomes possible to obtain a permanent magnet type rotating electric machine with a rotor having skew, in which the entire rotor is symmetric between forward and reverse rotations though each part of the rotor or each single magnetic pole is asymmetric between forward and reverse rotations, and demagnetization resistance is great as a whole while a magnet with a small weight or a magnet made of a low-coercivity material is used in the rotor.

It is noted that, within the scope of the present invention, the above embodiments may be freely combined with each other, or each of the above embodiments may be modified or abbreviated as appropriate.

DESCRIPTION OF THE REFERENCE CHARACTERS 1 stator, 2 rotor, 2a rotational-direction advanced side, 2b rotational-direction delayed side, 21 axial end A, 22 axial end B, 2X, 2Y rotor part, 2A, 2B rotor part, 3 rotor, 31 axial end A, 32 axial end B, 3A, 3B rotor part: 4 rotor, 41 axial end A, 42 axial end B, 4A, 4B, 4C rotor part, 5 rotor, 51 axial end A, 52 axial end B, 6 rotor, 61 axial end A, 62 axial end B, 6A, 6B, 6C rotor part, 7 rotor, 71 axial end A, 72 axial end B, 7A, 7B rotor part, PM permanent magnet, C center among magnetic poles in entire rotor, D portion likely to be demagnetized, G portion having great coercivity

The invention claimed is:

1. A permanent magnet type rotating electric machine comprising:
    a rotor in which a plurality of magnet poles are formed by
        a plurality of rotor permanent magnets, wherein, a predetermined rotational direction of the rotor around an axis is defined as a positive rotation direction, a circumferential direction on the rotor corresponding to the positive rotation direction is defined as a positive direction, a negative direction being opposite to the positive direction, each permanent magnet of the plurality of rotor permanent magnets having a positive side end on a side of the permanent magnet in the positive direction and a negative side end on a side of the permanent magnet in the negative direction, and circumferentially overlapping permanent magnets of plurality of rotor permanent magnets having a same polarity comprise respective groups, each group of the groups having a magnetic pole center, which is an average of the permanent magnets of the group, the rotor including
        a first rotor part positioned at a first axial position of the rotor, the first rotor part including first permanent magnets of the plurality of rotor permanent magnets arranged circumferentially around the stator, and each first permanent magnet having a magnetic pole position, which is displaced in the positive direction with respect to the magnetic pole center of the group of the first permanent magnet, and
        a second rotor part positioned at a second axial position of the rotor, which is different from the first axial position of the rotor, the second rotor part including second permanent magnets of the plurality of rotor permanent magnets arranged circumferentially around the stator, and each second permanent magnet of the second permanent magnets having a magnetic pole position that is displaced in a negative direction with respect to the magnetic pole center of the group of the second permanent magnet, wherein
in each of the first permanent magnets, the positive side end is more resistant to demagnetization than the negative side end, and the positive side end is as thick or thicker than the negative side end, and
in each of the second permanent magnets, the negative side end is more resistant to demagnetization than the positive side end, and the negative side end is as thick or thicker than the positive side end.

2. The permanent magnet type rotating electric machine according to claim 1, wherein
in each of the first permanent magnets, the positive side end has a greater thickness than the negative side end, and
in each of the second permanent magnets, the negative side end has a greater thickness than the positive side end.

3. The permanent magnet type rotating electric machine according to claim 1, wherein
in each of the first permanent magnets, the positive side end has greater coercivity than the negative side end, and
in each of the second permanent magnets, the negative side end has greater coercivity than the positive side end.

4. The permanent magnet type rotating electric machine according to claim 1, further comprising:
a third rotor part positioned at a third axial position of the rotor between the first axial position and the second axial position of the rotor, the third rotor part including third permanent magnets of the plurality of rotor permanent magnets arranged circumferentially around the stator, wherein
each third permanent magnet has a magnetic pole position that coincides with the magnetic pole center of the group of the third permanent magnet.

5. The permanent magnet type rotating electric machine according to claim 1, wherein
the first rotor part further includes that some of the first permanent magnets are positioned at a third axial position of the rotor, and
the second axial position of the rotor is between the first axial position of the rotor and the third axial position of the rotor.

6. The permanent magnet type rotating electric machine according to claim 1, wherein
in the rotor, the first permanent magnets and the second permanent magnets are embedded in respective rotor iron cores forming the first rotor part and the second rotor part.

7. The permanent magnet type rotating electric machine according to claim 1, further comprising:
a stator generating a magnetic field, wherein
when the rotor rotates in the positive rotation direction, the positive side end of the first permanent magnet is subjected to the magnetic field from the stator in a direction to strengthen a magnetic flux of the first permanent magnet, and the negative side end of the second permanent magnet is subjected to the magnetic field from the stator in a direction to weaken a magnetic flux of the second permanent magnet, and
when the rotor rotates in a direction opposite to the positive rotation direction, the positive side end of the first permanent magnet is subjected to the magnetic field from the stator in a direction to weaken a magnetic flux of the first permanent magnet, and the negative side end of the second permanent magnet is subjected to the magnetic field from the stator in a direction to strengthen a magnetic flux of the second permanent magnet.

* * * * *